(12) United States Patent
Chang et al.

(10) Patent No.: US 9,699,613 B2
(45) Date of Patent: Jul. 4, 2017

(54) SYSTEM FOR MEMORIZING OBJECT LOCATION AND METHOD THEREOF

(71) Applicants: INVENTEC APPLIANCES (PUDONG) CORPORATION, Shanghai (CN); INVENTEC APPLIANCES (SHANGHAI) CO., LTD., Shanghai (CN); INVENTEC APPLIANCES CORP., New Taipei (TW); INVENTEC APPLIANCES (NANCHANG) CORPORATION, Jiangxi (CN)

(72) Inventors: Ching Sung Chang, New Taipei (TW); Dai-Shui Ho, New Taipei (TW); Xue-Jiao Zhang, Jiangxi (CN)

(73) Assignees: Inventec Appliances (Pudong) Corporation, Shanghai (CN); Inventec Appliances (Shanghai) Co., Ltd., Shanghai (CN); Inventec Appliances Corp., New Taipei (TW); Inventec Appliances (Nanchang) Corporation, Jiangxi (CN)

( * ) Notice: Subject to any disclaimer, the term of this patent is extended or adjusted under 35 U.S.C. 154(b) by 232 days.

(21) Appl. No.: 14/306,107

(22) Filed: Jun. 16, 2014

(65) Prior Publication Data

US 2015/0168533 A1    Jun. 18, 2015

(30) Foreign Application Priority Data

Dec. 16, 2013 (CN) .......................... 2013 1 0689922

(51) Int. Cl.
*H04Q 5/22* (2006.01)
*H04W 4/02* (2009.01)
(Continued)

(52) U.S. Cl.
CPC ........... *H04W 4/025* (2013.01); *H04W 4/008* (2013.01); *G06K 7/10009* (2013.01)

(58) Field of Classification Search
CPC ..... H04W 4/008; H04W 4/025; H04W 4/028; H04W 4/043; H04W 64/00; H04N 5/232;
(Continued)

(56) References Cited

U.S. PATENT DOCUMENTS 7,378,968 B2 * 5/2008 Wang .................... G01S 5/0018
340/539.13
7,468,650 B2 * 12/2008 Childress ............... G06K 17/00
340/5.92
(Continued)

*Primary Examiner* — Adnan Aziz
(74) *Attorney, Agent, or Firm* — Muncy, Geissler, Olds & Lowe, P.C.

(57) ABSTRACT

A system for memorizing object location, for detecting an object storage position, includes: a wireless sensor module disposed in an interior space to generate a wireless sensor signal; a mobile device having an application program to start and initialize the wireless sensor module, the application program having a function of using the wireless sensor signal to calculate out a positioning data, and producing an object position integration information; and a cloud storage server connected to the mobile device via a communication link to receive the object position integration information and store the information in an object position memorizing database.

17 Claims, 8 Drawing Sheets

(51) Int. Cl.
   *H04W 4/00* (2009.01)
   *G06K 7/10* (2006.01)
(58) Field of Classification Search
   CPC ......... H04L 67/10; G01S 1/68; G01S 5/0018;
                 G01S 5/02; G01S 5/021; G01S 5/0252;
                 Y02B 60/50
   USPC .................. 340/10.1, 539.13, 572.1, 825.49
   See application file for complete search history.

(56) References Cited

U.S. PATENT DOCUMENTS

| | | | | |
|---|---|---|---|---|
| 7,941,159 B2* | 5/2011 | Walley | .................. | G01S 5/0252 455/404.2 |
| 8,639,184 B2* | 1/2014 | Eruchimovitch | ..... | G01S 5/0221 455/404.1 |
| 8,983,491 B2* | 3/2015 | Hiltunen | ............... | H04W 64/00 340/539.11 |
| 2004/0095276 A1* | 5/2004 | Krumm | ................ | G01S 5/0252 342/465 |
| 2004/0152471 A1* | 8/2004 | MacDonald | .......... | G01S 5/0252 455/456.1 |
| 2005/0261004 A1* | 11/2005 | Dietrich | .................... | G01S 5/02 455/456.2 |
| 2006/0055530 A1* | 3/2006 | Wang | ....................... | G01S 5/02 340/539.13 |
| 2006/0265664 A1* | 11/2006 | Simons | .................. | A62B 99/00 715/772 |
| 2007/0060098 A1* | 3/2007 | McCoy | ................. | G01S 5/0289 455/404.2 |
| 2007/0127422 A1* | 6/2007 | Belcea | ................. | H04W 64/00 370/338 |
| 2007/0247366 A1* | 10/2007 | Smith | ..................... | G01S 5/021 342/464 |
| 2008/0248813 A1* | 10/2008 | Chatterjee | ................. | G01S 1/68 455/456.2 |
| 2010/0157899 A1* | 6/2010 | Manz | .................... | H04W 40/20 370/328 |
| 2010/0325476 A1* | 12/2010 | Zhang | .................. | G06F 11/1662 714/4.1 |
| 2013/0316740 A1* | 11/2013 | Scarafia | ................ | H04W 4/043 455/456.5 |

\* cited by examiner

SYSTEM FOR MEMORIZING OBJECT LOCATION AND METHOD THEREOF

FIELD OF THE INVENTION

The present invention relates to a system for memorizing object location and method thereof, in particular to a system for memorizing interior object location with a cloud system.

BACKGROUND OF THE INVENTION

People may forget where they store an object when the object was stored long time ago and it's really hard to recall to mind. In addition, people may place daily necessities without attention. Both situations make it difficult for people to find the object they want.

On the other hand, an object usually store in a specific room which is only known by the keeper of the object. It's hard for others to find the object when the keeper is not present. To solve the above mentioned problems, the present invention provides a system for memorizing object location and method for people to find objects that are stored in an interior specific room or casually placed somewhere.

SUMMARY OF THE INVENTION

The present invention provides a system for memorizing object location to detect the storing position of an object, wherein the system includes: a wireless sensing module disposed in interior space to generate a wireless sensing signal; and a mobile device equipped with an application program having a function of obtaining a position of an object within the interior space by utilizing the wireless sensing signal and calculating out a positioning data of the object and generating a position integration data of the object according to the positioning data.

In an embodiment, the mobile device is placed beside the object, and the application program detects the position of the mobile device by utilizing the wireless sensing signal to obtain the position of the object.

In an embodiment, the mobile device further includes an image picking up unit to photograph the object to get an image data which is to be imported into the position integration data of the object via the application program.

In an embodiment, the mobile device further comprises an enter unit to enter an additional text message of the object which is to be imported into the position integration data of the object via the application program.

In an embodiment, the system further includes a RFID tag which is placed on the object and the application program utilizes the wireless sensing signal to detect the position of the RFID tag and to obtain the position of the object.

In an embodiment, the system further includes: a cloud storing server equipped with a memorizing database and connected with the mobile device via a communication link to receive the position integration data of the object and stores the position integration data into the memorizing database.

In an embodiment, the mobile device sends an inquiring request to the cloud storing sever to obtain the position integration data.

In an embodiment, the application program of the system has a function of starting and initializing the wireless sensing module.

The present invention also provides a method for memorizing object location to detect the storing position of an object, including the steps: detecting the position of a mobile device beside an object by utilizing a wireless sensing module to generate a positioning data of the object; generating a position integration data of the object by utilizing the positioning data; and uploading the position integration data to a cloud storing server.

In an embodiment, before the step of detecting the position of the mobile device beside the object by utilizing the wireless sensing module to generate the positioning data, the method for memorizing object location further includes the step of: starting the wireless sensing module and setting a network topology configuration of the wireless sensing module by the mobile device.

In an embodiment, the method for memorizing object location further includes the steps of: initializing the wireless sensing module by an application program installed in the mobile device.

In an embodiment, the step of generating a position integration data of the object by utilizing the positioning data further comprises the step of: downloading the position integration data of the object by the mobile device; displaying the position integration data of the object by the mobile device.

In an embodiment, the step of generating the position integration data of the object by utilizing the positioning data further includes the steps of: obtaining an image data of the object; and importing the image data into the position integration data.

In an embodiment, the step of generating the position integration data of the object by utilizing the positioning data further comprises the steps of: obtaining an additional text message of the object; and importing the additional text message into the position integration data.

The present invention also provides a method for memorizing object location to detect the storing position of an object, including the steps: detecting a position of a RFID tag on an object by a wireless sensing module to generate a first positioning data of the object; generating a position integration data of the object by utilizing the first positioning data; and uploading the position integration data to a cloud storing server.

In an embodiment, the method of detecting the storing position of an object further includes the steps of: downloading the position integration data to obtain a position record of the object; detecting the position of the RFID tag by the wireless sensing module to generate a second positioning data; and comparing the position record and the second positioning data.

In an embodiment, the method of detecting the storing position of an object further includes the steps of: generating a graphical data according to a result of comparing the position record and the second positioning data; and displaying the graphical data on a mobile device.

In an embodiment, before the step of detecting the position of the RFID tag on the object by the wireless sensing module to generate the first positioning data of the object further includes the step of: starting the wireless sensing module and setting a network topology configuration of the wireless sensing module by a mobile device.

In an embodiment, the method of detecting the storing position of an object further includes the steps of: initializing the wireless sensing module by an application program installed in the mobile device.

In an embodiment, the position integrated data further includes a unique identified code of the RFID tag.

With the system for memorizing object location, users are able to get the position of a stored object by a mobile device connecting a memorizing database.

With the system for memorizing object location and method of the present invention, users can inquire the position of a daily necessity by a mobile device, even the daily necessity is moved to somewhere that users don't know.

BRIEF DESCRIPTION OF THE DRAWINGS

The invention will become more fully understood from the detailed description given herein below illustration only, and thus is not limitative of the present invention, and wherein.

DETAILED DESCRIPTION OF THE PREFERRED EMBODIMENT

The present invention will be apparent from the following detailed description, which reference to the accompanying drawings, wherein the same references relate to the same elements. The following paragraphs describe embodiments of the disclosed system for memorizing object location and method of the invention.

Figure 1:
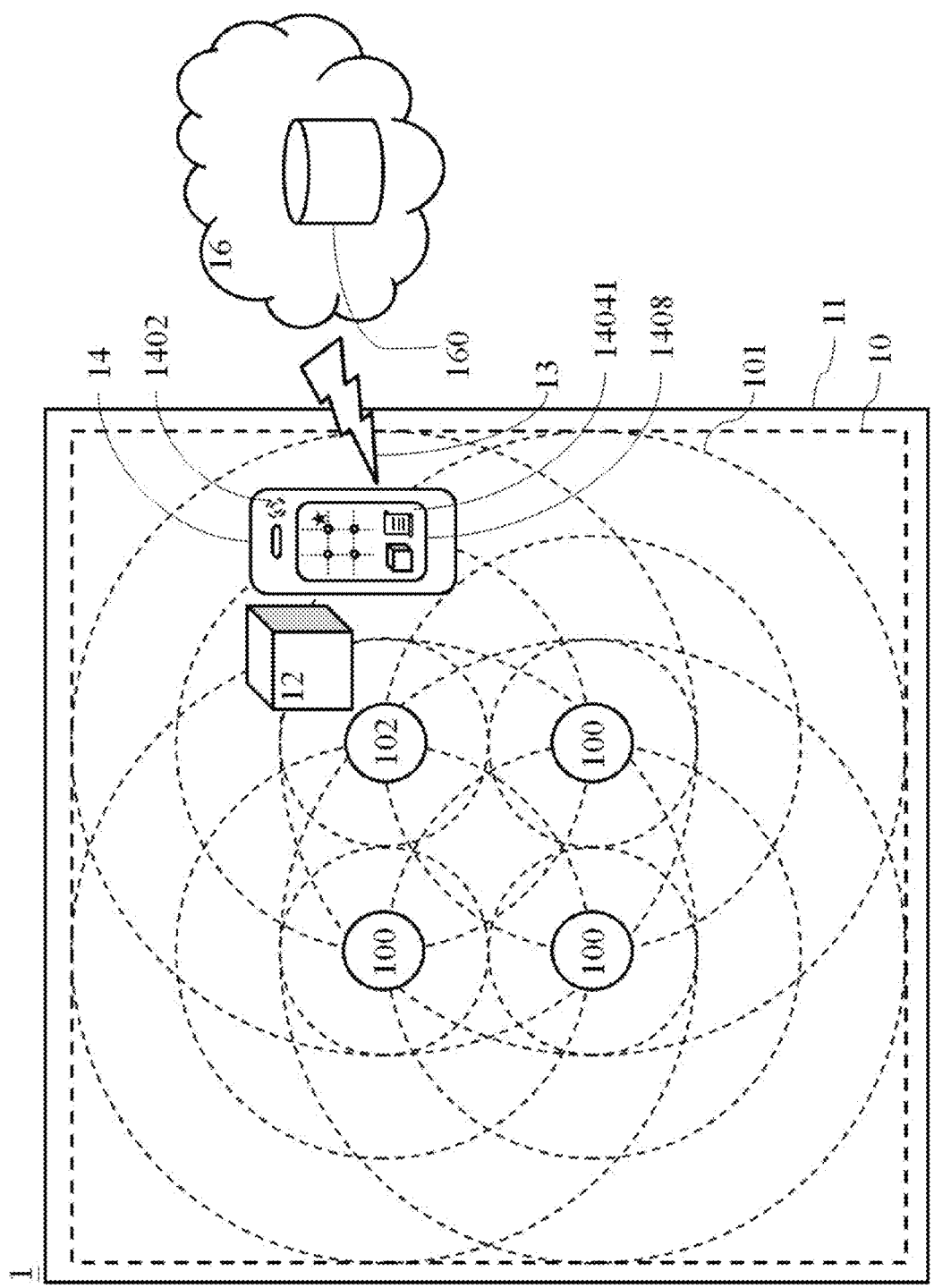
FIG. 1 is a schematic diagram of the system for memorizing object location in a first embodiment of the present invention.

First, please refer to FIG. 1. FIG. 1 is a schematic diagram of the system 1 for memorizing object location in the first embodiment of the present invention. As FIG. 1 shows, an object 12 seldom used is stored in a specific space of the interior space 11. A mobile device 14 having an application program 14041 with a function of object position memorizing is placed beside the object 12 when the object 12 is stored. The application program 14041 is further configured to start and initiate a wireless sensing module 10 disposed in the interior space 11. The wireless sensing module 10 includes a plurality of reference node 100, a coordinate node 102 spread randomly in the interior space 11. Wherein the embodiment of wireless sensing module 10 is but not limited to wireless local area network (IEEE 802.11b/g/n, WLAN, Wi-Fi), Zigbee (IEEE 802.15.54), RuBee (IEEE 1902.1), WiBree, Bluetooth, Ultra Wide Band (UWB) or Radio Frequency Identification (RFID), etc. The wireless sensing module 10 has at least the following modules: network topology configuration, Transmitted Signal Strength Indicator (TSSI), Received Signal Strength Indicator (RSSI), Carrier to Interference plus Noise Ratio (CINR) and interior space 11 arrangement data. The interior space 11 arrangement data can include the arrangement and type of the furniture in the interior space 11. The application program 14041 initializes and uploads the modules of the wireless sensing module 10 to generate a module setting data.

After the application program 14041 has initialized the wireless sensing module 10, the application program 14041 detects the mobile device 14 position by utilizing the wireless sensing signal 101 generated from the reference nodes 100 and the coordinate node 102, and then acquires a positioning data to generate a graphical data corresponding to the positioning data. And then the graphical data is displayed on the display unit 1408 of the mobile device 14. The positioning data can also show the storing position of the object 12 because the mobile device 14 is placed beside the object 12, and the embodiment of the wireless sensing signal 101 is depended on the abovementioned wireless sensing module 10 embodiments. For the positioning data shows the storing position of the object 12, the application program 14041 obtains the storing position of the object 12 when the application program 14041 acquires the positioning data. Besides acquiring the positioning data, user can further utilize an image pickup unit 1402 of the mobile device 14 to acquire an image data by photographing the object 12 or utilize an enter unit of the mobile device 14 to add additional text message via the application program 14041. The application program 14041 generates a position integration data according to module setting document of the wireless sensing module 10, positioning data, image data and additional text message, and then the position integration data is uploaded to a cloud storing sever 16 equipped with a memorizing database 160 through a communication link 13. Users can view the position integration data stored in the memorizing database 160 after the cloud storing sever 16 uploads the position integration data. In addition, users obtain the position integration data by sending an inquiring request to the cloud storing sever 16 with the mobile device 14.

The communication link 13 is but not limited to the following communication protocol: Open System Interconnection Reference Model (OSI), Transmission Control Protocol/Internet Protocol (TCP/IP), Carrier Sense Multiple Access with Collision Detect (CSMA/CD), Point to Point Protocol (PPP), PPP over Ethernet (PPPoE), Cable modem, Local Area Network (LAN), Wide Area Network (WAN), World Wide Web (WWW), NetWare, IPX/SPX, Net BEUI, Apple Talk, Asymmetric Digital Subscriber Loop (ADSL), Public Switched Telephone Network (PSTN), Integrated Services Digital Network (ISDN), Asynchronous Transfer Mode (ATM), WiFi, Bluetooth, Wide band Code Division Multiple Access (WCDMA), Code Division Multiple Access 2000 (CDMA2000), High Speed Package Access (HSPA), Long Term Evolution (LTE), Evolution-Data Optimized (EV DO), Zigbee, Worldwide Interoperability For Access (WIMAX), 3G, General Packet Radio Service (GPRS), Global System for Mobile Communication (GSM).

Figure 2:
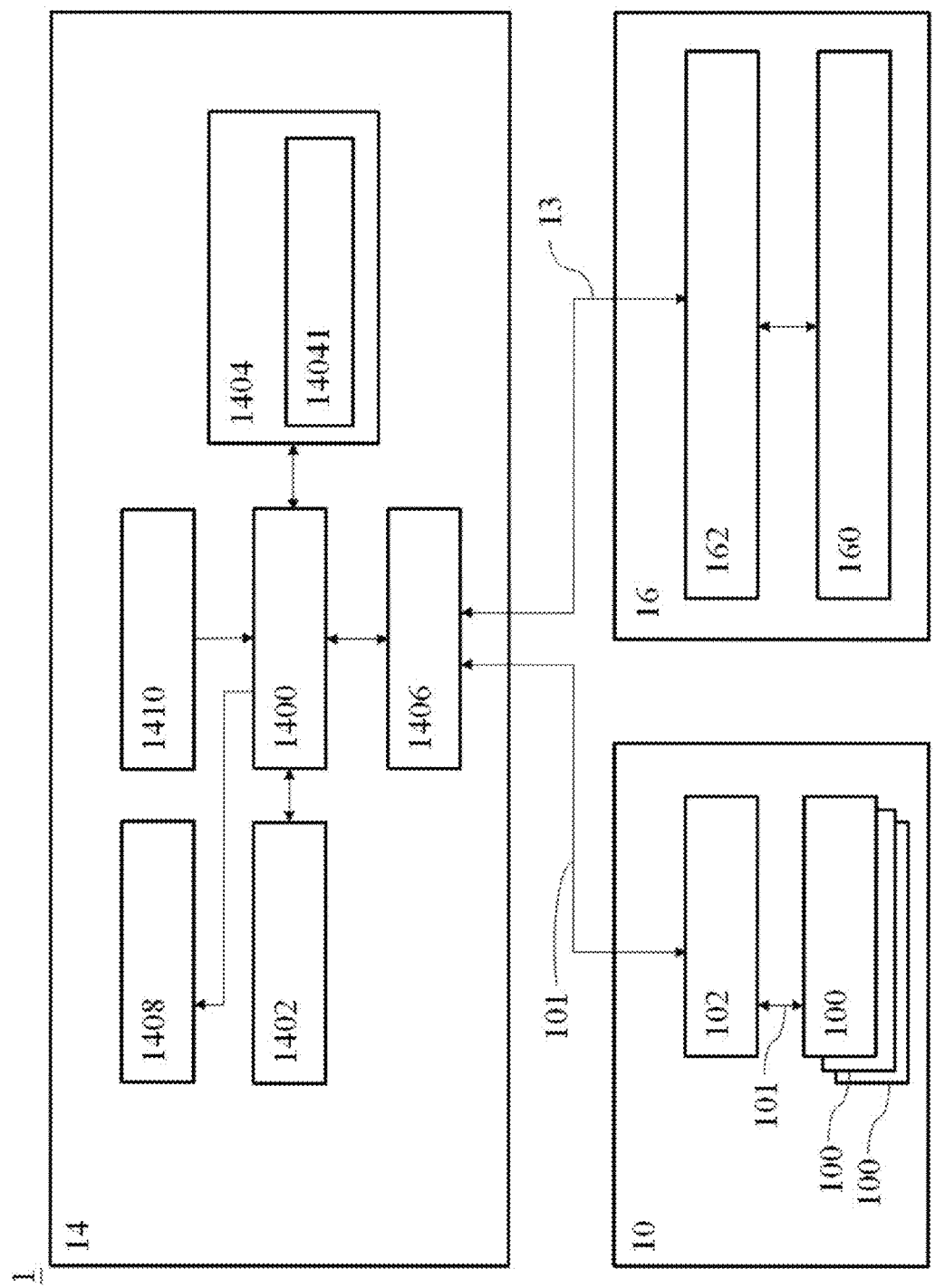
FIG. 2 is a systematic block diagram of the system for memorizing object location in the first embodiment of the present invention.

Please refer to FIG. 2. FIG. 2 is a systematic block diagram of the system for memorizing object location in the first embodiment of the present invention. As FIG. 2 shows, the system 1 for memorizing object location includes a mobile device 14, a wireless sensing module 10 and a cloud storing sever 16; the connections between the units will be described later. The wireless sensing module 10 is constituted by a plurality of reference nodes 100 and a coordinate node 102 while each of the reference nodes 100 is connected to the other reference nodes 100 and the coordinate node 102 with wireless sensing signal. The mobile device 14 includes at least a processing unit 1400, an image picking up unit 1402, a memorizing unit 1404 storing the application program 14041, a communication unit 1406, a display unit 1408 and an enter unit 1410, meanwhile, the image picking up unit 1402, memorizing unit 1404, communication unit 1406, display unit 1408 and the enter unit 1410 respectively electrical connect to the processing unit 1400, wherein the coordinate node 102 of the wireless sensing module 10 is connected to the communication unit 1406 of the mobile device 14 with wireless sensing signal 101. Furthermore, the coordinate node 102 can be either fixedly arranged or initializing function of application program 14041 installed in the mobile device 14. The coordinate node 102 is generated by changing one of the reference nodes 100 configuration. The cloud storing sever 16 has at least an object position memorizing/inquiring unit 162 to receive the uploaded position integration data through the communication link 13 and to store the position integration data in a memorizing database 160. The embodiment of the cloud storing server 16 interface can be a website, so that users can visit the website and inquiry the position integration data. In addition, the embodiment of the cloud storing sever 16 is but not limited to group of cloud host, server, personal computer, mobile device, notebook, personal digital assistant, cellular phone or application program.

Figure 3:
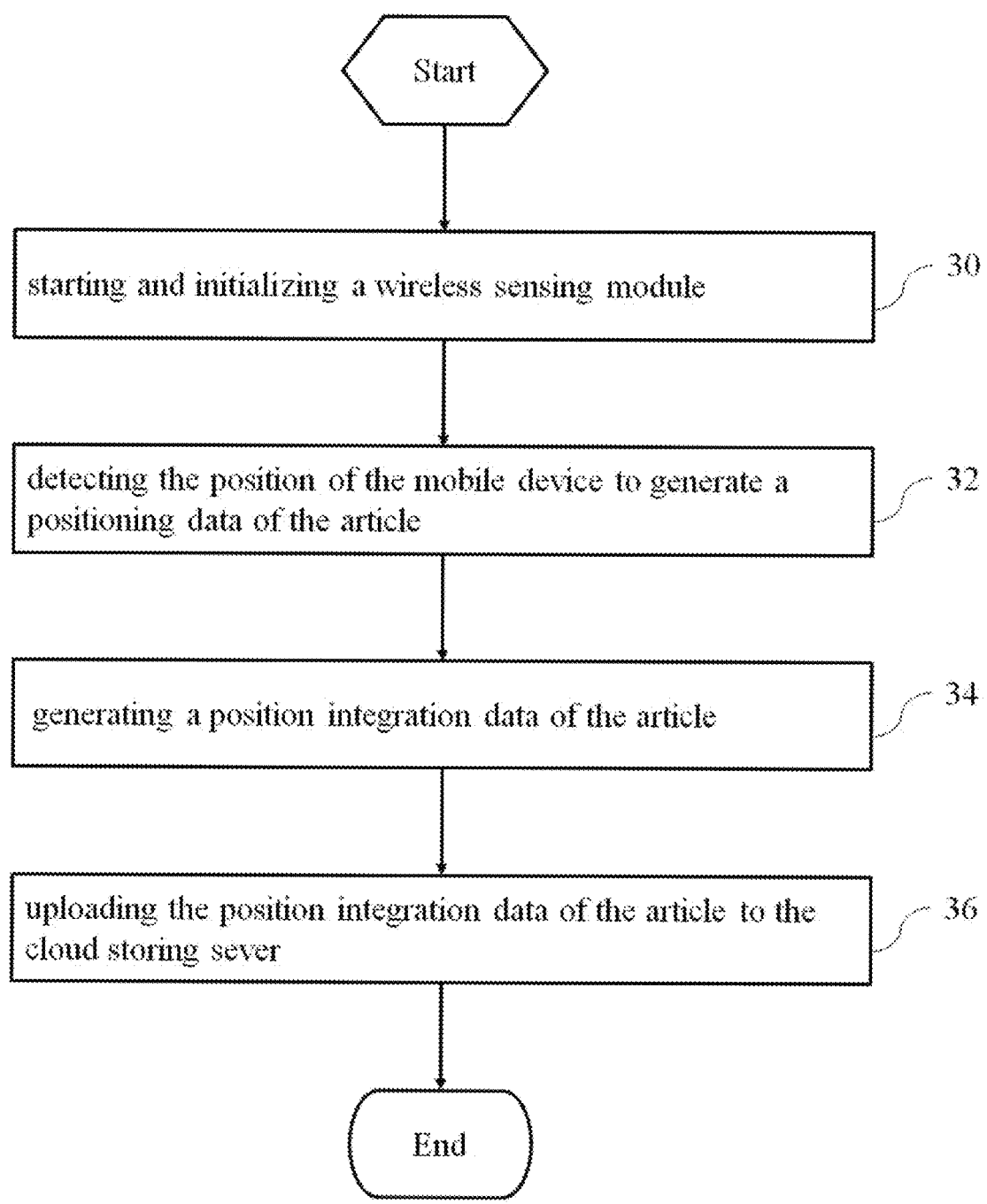
FIG. 3 is a flow chart illustrating the process of uploading the position integration data of the method for memorizing object location in the first embodiment of the present invention.

Please refer to FIG. 3. FIG. 3 is the flow chart of uploading the position integration data of the method for memorizing object location first embodiment of the present invention. As FIG. 3 shows, conducting the method for memorizing object location with the system 1 for memorizing object location shown in the FIGS. 1 & 2 comprises the following steps:

Step 30: starting and initializing a wireless sensing module 10 by a mobile device 14 and then setting a network topology configuration of the wireless sensing module 10; wherein the initialization is implemented by an application program 14041 installed in the mobile device 14.

Step 32: detecting the position of the mobile device 14 besides an object 12 by utilizing the wireless sensing module 10 to generate a positioning data of the object 12; wherein the communication unit 1406 acquires the wireless sensing signal 101 generated from a plurality of reference nodes 100 or a coordinate node 102 to acquire the position of the mobile device 14, and then the application program 14041 generates the positioning data according to the mobile device 14 position.

Step 34: generating a position integration data of the object 12 by utilizing the positioning data; in an embodiment, the application program 14041 further obtains an image data of the object and then importing the image data into the position integration data; in another embodiment, the application program 14041 further obtains an additional text message of the object and then importing the additional text message into the position integration data; in another embodiment, the application program 14041 generates position integration data of the object 12 according to the module setting document, the positioning data, the image data and the additional text message of the wireless sensing module 10.

Step 36: uploading the position integration data of the object 12 to the cloud storing sever 16; wherein the position integration data of the object 12 is uploaded to a cloud storing sever 16 through the communication link 13 and is stored in the memorizing database 160.

Figure 4:
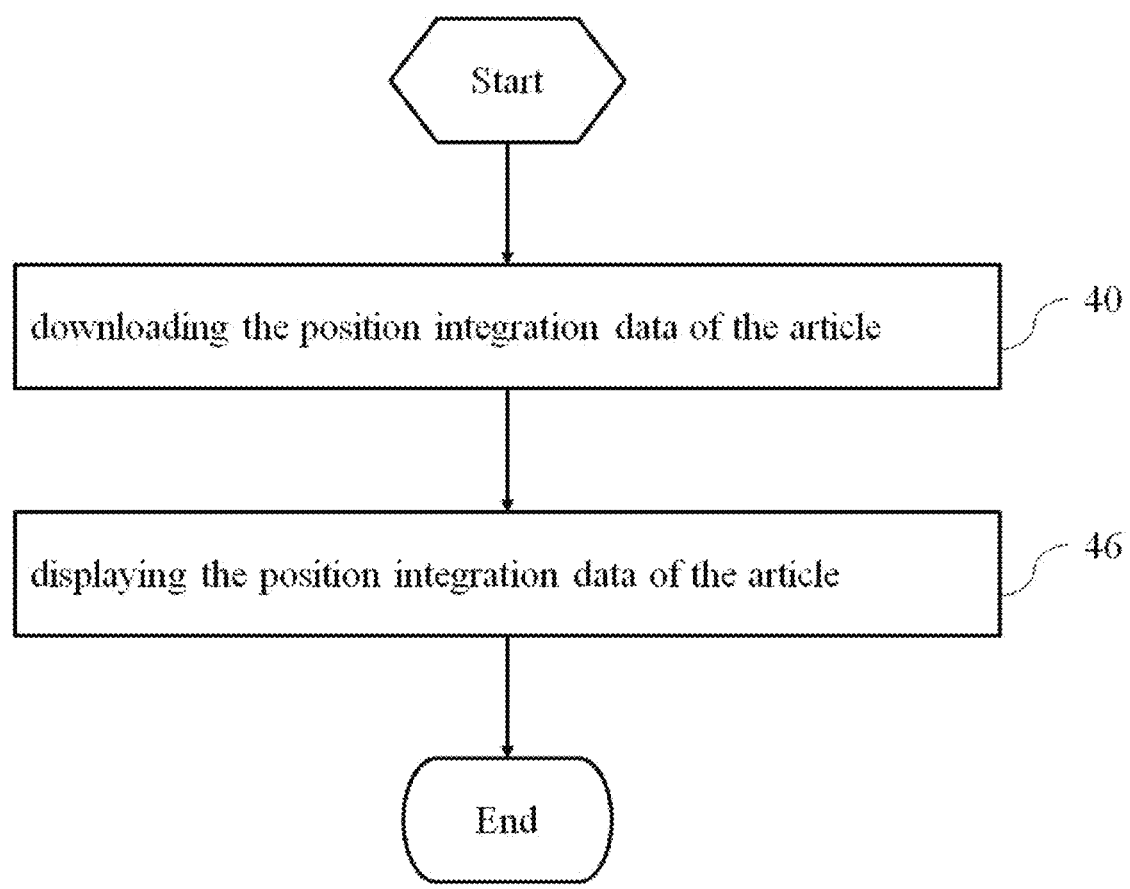
FIG. 4 is a flow chart illustrating the process of inquiring a stored object according to the method for memorizing object location in first embodiment of the present invention.

Please refer to FIG. 4. FIG. 4 is the flow chart of inquiring an object with the method for memorizing object location first embodiment of the present invention. As FIG. 4 shows, inquiring object position with the system 1 for memorizing object location shown in FIGS. 1 & 2 comprises the following steps:

Step 40: downloading the position integration data of the object 12 by the mobile device 14; wherein the mobile device sends an inquiring request to the cloud storing sever 16 through the communication link 13. The object position memorizing/inquiring unit 162 then generates an inquiring result which can be position integration data about one or a plurality of object, and then the object position integration data is download by the mobile device 14 through the communication link 13. In addition, the mobile device is but not limited to a server, a Personal Computer, a Notebook, a Personal Digital Assistant, or a cellular phone.

Step 46: displaying the position integration data of the object 12 by the mobile device 14; wherein the application program 14041 of the mobile device 14 displays the position integration data downloaded from the cloud storing sever 16 on the display unit 1408 of the mobile device 14. Furthermore, the position integration data includes positioning data, image data and additional text message.

Figure 5:
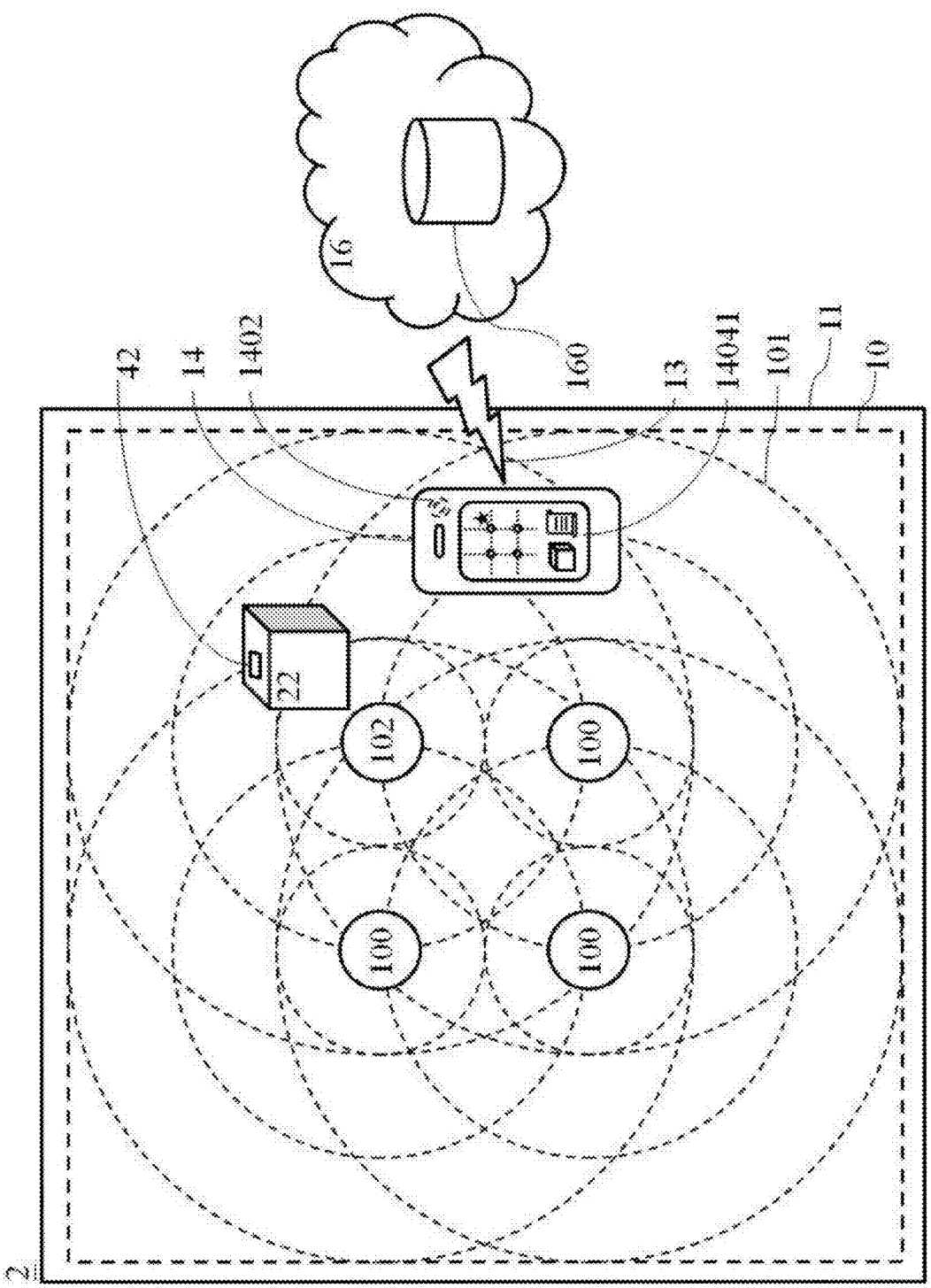
FIG. 5 is a schematic diagram of the system for memorizing object location in the second embodiment of the present invention.

Please refer to FIG. 5, FIG. 5 is a schematic diagram of the system 2 for memorizing object location second embodiment of the present invention. As FIG. 5 shows, a Radio Frequency Identification (RFID) tag 42 with a unique identified code is installed on a daily necessity 22 so that a particular RFID tag 42 can be identified from a plurality of RFID tags 42. For the wireless sensing module 10 of FIG. 5, the arrangement in the interior space 11 and the connection relationship with the mobile device 14 are the same as that of FIG. 1, and it is not to be described herein.

The application program 14041 detects the position of the RFID tag 42 to acquire a positioning data according to the wireless sensing signal 101 generated from the reference nodes 100 or the coordinate node 102 after the application program 14041 has done the initialization. A graphical data corresponding to the positioning data is then generated and displayed on the display unit 1408 of the mobile device 14. The positioning data shows the position of the daily necessity 22 because the RFID tag 42 is installed on the daily necessity 22. For the positioning data shows the position of daily necessity 22, the application program 14041 obtains the position of daily necessity 22 when the application program 14041 acquires the positioning data. In addition, the embodiment of the wireless sensing signal 101 is depended on the abovementioned wireless sensing module 10 embodiments. Besides the positioning data, users can photograph the daily necessity 22 to acquire an image data by the image picking up unit 1402 of mobile device 14 and add additional text message by the mobile device 14. According to the generated module setting and positioning data from the wireless sensing module 10, the image data, the additional text message and the unique identified code of the RFID tag 42, the application program 14041 generates a position integration data and then uploads the position integration data to a cloud storing sever 16 though a communication link 13. The cloud storing server 16 analyzes the uploaded position integration data and then stores it in a memorizing database 160 so that users can inquire the uploaded data.

Figure 6:
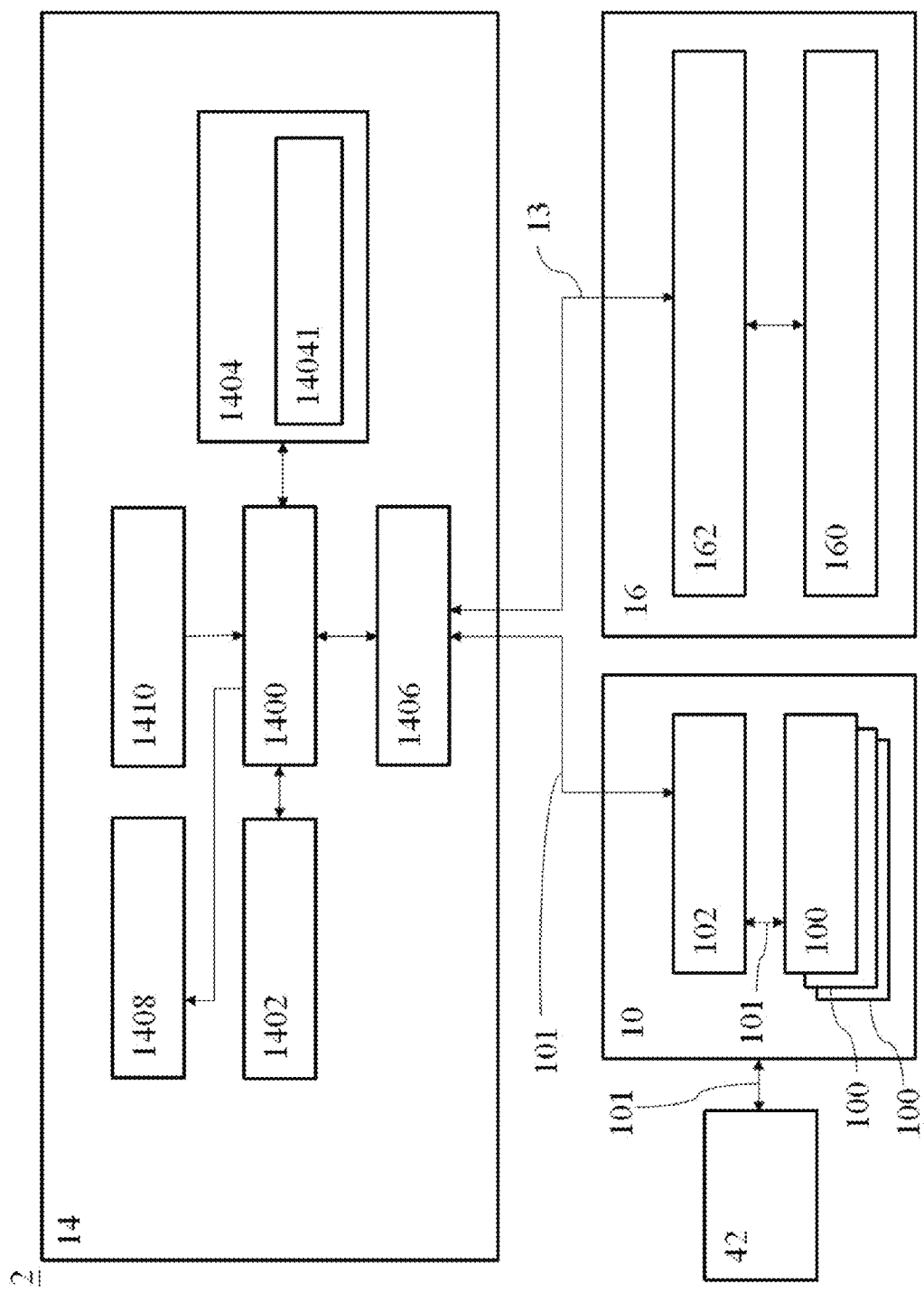
FIG. 6 is a systematic block diagram of the system for memorizing object location in the second embodiment of the present invention.

Please refer to FIG. 6, FIG. 6 is a systematic block diagram of the system 2 for memorizing object location second embodiment of the present invention. As FIG. 6 shows, the system for memorizing object location 2 comprises a mobile device 14, a wireless sensing module 10, a cloud storing server 16 and a RFID tag 42, wherein the wireless sensing module 10 detects the RFID tag 42 with the wireless sensing signal 101, which also makes the application program 14041 generate a positioning data. For the arrangement and the connection relationships about the other units are the same as the system for memorizing object location 1 shown in FIG. 2, it is not to be described herein.

Figure 7:
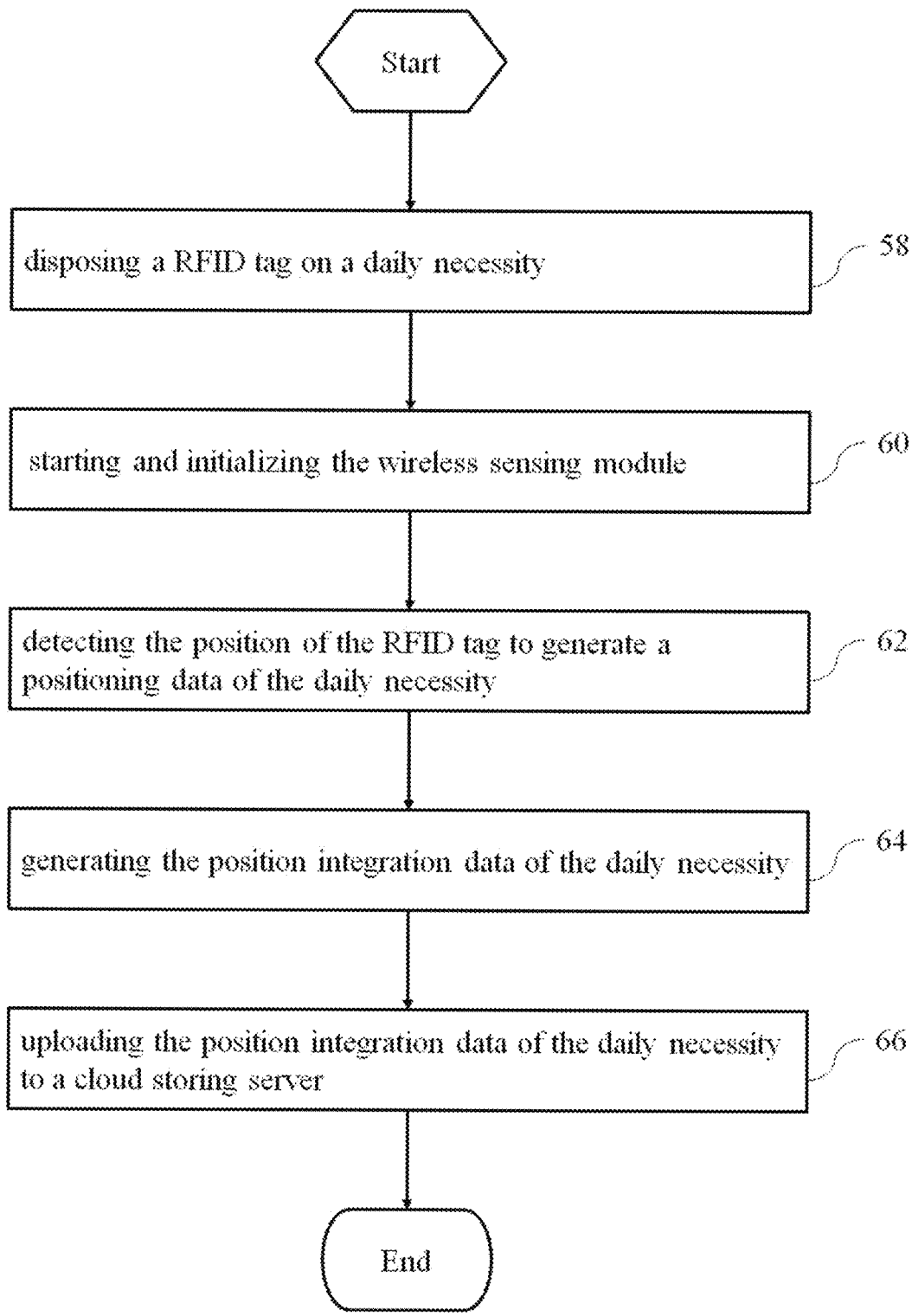
FIG. 7 is a flow chart illustrating the process of uploading daily necessity position integration data of the method for memorizing object location in the second embodiment of the present invention.

Please refer to FIG. 7. FIG. 7 is the flow chart of uploading daily necessity position integration data of the method for memorizing object location second embodiment of the present invention. As FIG. 7 shows, conducting the method for memorizing object location with the system 2 for memorizing object location shown in FIG. 5, 6 comprises the steps:

Step 58: placing a RFID tag 42 on a daily necessity 22.

Step 60: starting and initializing the wireless sensing module 10 by the mobile device 14 which includes setting the network topology configuration of the wireless sensing module 10; wherein the mobile device 14 initializes the wireless sensing module 10 by the application program 14041.

Step 62: detecting the position of the RFID tag 42 by the wireless sensing module 10 and the mobile device 14 generating a first positioning data of the daily necessity 22; wherein the RFID tag 42 receives the wireless sensing signal 101 generated from the reference nodes 100 or coordinate node 102, the mobile device 14 then detects the position of the RFID tag 42 by the communication unit 1406. The application program 14041 computes the first positioning data with the RFID tag 42 position.

Step 64: generating the position integration data of the daily necessity 22 by utilizing the first positioning data of the daily necessity 22; wherein the application program 14041 generates the position integration data of the daily necessity 22 according to a module setting data of the wireless sensing module 10 generated from the application program 14041, the first positioning data, an image data, an additional text message and the unique identified code of the RFID tag 42.

Step 66: uploading the position integration data of the daily necessity 22 to a cloud storing server 16; wherein the integration data of the daily necessity is uploaded to the cloud storing server 16 through the communication link 13 and then is stored in the memorizing database 160.

Figure 8:
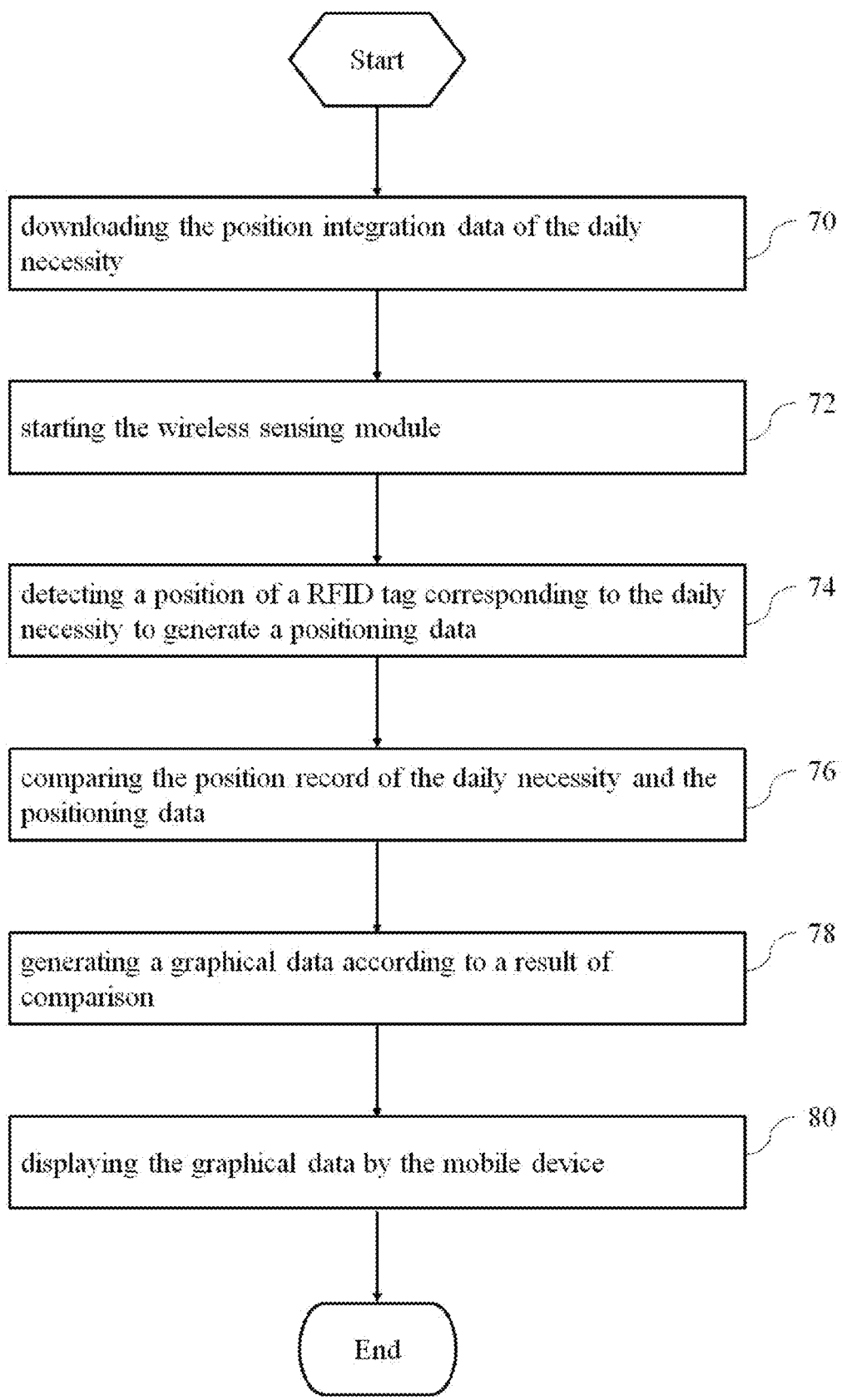
FIG. 8 is a flow chart illustrating the process of inquiring a daily necessity according to the method for memorizing object location in the second embodiment of the present invention.

Please refer to FIG. 8. FIG. 8 is the flow chart of inquiring a daily necessity of the method for memorizing object location second embodiment of the present invention. As FIG. 8 shows, conducting the wireless sensing module 10, the RFID tag 42 on the daily necessity 22, the mobile device 14 and the cloud storing server 16 shown in FIGS. 5 & 6 to inquire an object comprises the steps of:

Step 70: downloading the position integration data of the daily necessity 22 to obtain a position record of the daily necessity 22; wherein the mobile device 14 sends the inquiry via the communication link 13, an object position memorizing/inquiring unit 162 of the cloud storing sever 16 generates a inquiring result according to the inquiry, and the inquiring result is download to the mobile device 14 via the communication link 13. In an embodiment, the inquiring result is a position integration data of an object or a group of objects.

Step 72: starting the wireless sensing module 10 by the mobile device 14; wherein the application program 14041 of the mobile device 14 starts the wireless sensing module 10 in the interior space 11 with the module setting data of the wireless sensing module 10 of the downloaded position integration data.

Step 74: detecting a position of a RFID tag 42 corresponding to the daily necessity 22 by the mobile device 14 to generate a second positioning data; wherein the application program 14041 detects the RFID tag 42 by the wireless sensing signal 101 to acquire the second positioning data; the wireless sensing signal 101 is generated by the wireless sensing module 10.

Step 76: comparing the position record of the daily necessity 22 and the second positioning data.

Step 78: generating a graphical data according to a result of comparing the position record of the daily necessity 22 and the second positioning data; if the comparison result is identical, the graphical data is about the record position of the daily necessity 22; if the comparison result is not identical which means the position of the daily necessity 22 is changed, a information of changed position of the daily necessity 22 must be imported into the graphical data.

Step 80: displaying the graphical data by the mobile device 14.

FIG. 1-4 show the system for memorizing object location and method of the present invention first embodiment. The first embodiment of the present invention is to obtain a stored position of an object 12 seldom used, for example, an object 12 is useful in a part of a year and is useless in the rest of the year, as a result, the object 12 will not be moved when it is stored. With the system for memorizing object location, users can inquire the position integration data from memorizing database 160 of the cloud storing server 16 by the mobile device 14, and then users can to get the stored position of the object 12.

FIG. 5-8 show the system for memorizing object location and method of the present invention second embodiment. The second embodiment of the present invention is to obtain a position of a daily necessity 22 used and moved usually, for example, remote controller and drug. After setting a RFID tag 42 on a daily necessity 22, users can inquire the position integration data from memorizing database 160 of the cloud storing server 16 by the mobile device 14, and the users can get the position of the daily necessity 12.

Although the invention has been described with reference to the preferred embodiments, this description is not meant to be construed in a limiting sense. It is apparent to those skilled in the art that a variety of modifications and changes may be made without departing from the scope of the present invention which is intended to be defined by the appended claims.

What is claimed is:

1. A system for memorizing object location, comprising:
a wireless sensing module disposed in an interior space to generate a wireless sensing signal, wherein the wireless sensing module includes a plurality of reference nodes and a coordinate node, wherein the coordinate node is generated by changing a configuration of one of the plurality of reference nodes, and wherein the wireless sensing signal is generated from the plurality of reference nodes and the coordinate node; and
a mobile device equipped with an application program initializing the wireless sensing module, the mobile device obtaining a position of an object within the interior space by utilizing the wireless sensing signal and calculating positioning data of the object and generating a position integration data of the object according to the position data,
wherein the mobile device is placed beside the object and the application program detects the position of the mobile device by utilizing the wireless sensing signal, thereby obtaining positioning data of the object, the positioning data of the object being a storing position of the object, and wherein the reference nodes and coordinate node are randomly spread throughout the interior space.

2. The system of claim 1, wherein the mobile device further comprises an image pickup unit to photograph the object to get an image data which is to be imported into the position integration data of the object via the application program.

3. The system of claim 1, wherein the mobile device further comprises an enter unit to enter an additional text message of the object which is to be imported into the position integration data of the object via the application program.

4. The system of claim 1, further comprises a RFID tag which is placed on the object and the application program utilizes the wireless sensing signal to detect the position of the RFID tag and to obtain the position of the object.

5. The system of claim 1, further comprising:
a cloud storing server equipped with a memorizing database and connected with the mobile device via a communication link to receive the position integration data of the object and stores the position integration data into the memorizing database.

6. The system of claim 5, wherein the mobile device sends an inquiring request to the cloud storing server to obtain the position integration data.

7. The system of claim 1, wherein the application program further has a function of starting the wireless sensing module.

8. A method for memorizing object location, comprising the steps of:
initializing a wireless sensing module by an application program installed in a mobile device;
detecting a position of the mobile device located beside an object by utilizing the wireless sensing module to generate a positioning data of the object, wherein the positioning data of the object is a storing position of the object, wherein the wireless sensing module includes a plurality of reference nodes and a coordinate node spread randomly throughout an interior space, wherein the coordinate node is generated by changing a configuration of one of the plurality of reference nodes;
generating a position integration data of the object by utilizing the positioning data; and
uploading the position integration data to a cloud storing server.

9. The method of claim 8, wherein before the step of initializing a wireless sensing module by an application program installed in a mobile device, the method further comprising the step of:
starting the wireless sensing module and setting a network topology configuration of the wireless sensing module by the mobile device.

10. The method of claim 8, wherein the step of generating a position integration data of the object by utilizing the positioning data further comprising the step of:

downloading the position integration data of the object by the mobile device;
displaying the position integration data of the object by the mobile device.

11. The method of claim 8, wherein the step of generating the position integration data of the object by utilizing the positioning data further comprises the step of:
obtaining an image data of the object; and
importing the image data into the position integration data.

12. The method of claim 8, wherein the step of generating the position integration data of the object by utilizing the positioning data further comprises the steps of:
obtaining an additional text message of the object; and
importing the additional text message into the position integration data.

13. A method for memorizing object location, comprising the steps of:
initializing a wireless sensing module by an application program installed in a mobile device;
detecting a position of a RFID tag on an object by the wireless sensing module to generate a first positioning data of the object, where the first positioning data of the object is a storing position of the object, wherein the wireless sensing module includes a plurality of reference nodes and a coordinate node spread randomly throughout an interior space, and wherein the coordinate node is generated by changing a configuration of one of the plurality of reference nodes;
generating a position integration data of the object by utilizing the first positioning data; and
uploading the position integration data to a cloud storing server.

14. The method of claim 13, further comprising the steps of:
downloading the position integration data to obtain a position record of the object;
detecting the position of the RFID tag by the wireless sensing module to generate a second positioning data; and
comparing the position record and the second positioning data.

15. The method of claim 14, further comprising the steps of:
generating a graphical data according to a result of comparing the position record and the second positioning data; and
displaying the graphical data on a mobile device.

16. The method of claim 13, wherein before the step of initializing a wireless sensing module by an application program installed in a mobile device further comprising the step of:
starting the wireless sensing module and setting a network topology configuration of the wireless sensing module by a mobile device.

17. The method of claim 13, wherein the position integration data further includes a unique identified code of the RFID tag.

* * * * *